United States Patent
Lai et al.

(10) Patent No.: US 9,590,503 B2
(45) Date of Patent: Mar. 7, 2017

(54) SWITCHING CONVERTER AND ASSOCIATED DISCHARGE METHOD

(71) Applicant: Monolithic Power Systems, Inc., San Jose, CA (US)

(72) Inventors: Pengjie Lai, San Jose, CA (US); Jian Jiang, Los Gatos, CA (US)

(73) Assignee: MONOLITHIC POWER SYSTEMS, INC., San Jose, CA (US)

( * ) Notice: Subject to any disclaimer, the term of this patent is extended or adjusted under 35 U.S.C. 154(b) by 156 days.

(21) Appl. No.: 14/489,343

(22) Filed: Sep. 17, 2014

(65) Prior Publication Data

US 2016/0079852 A1    Mar. 17, 2016

(51) Int. Cl.
| | |
|---|---|
| H02M 3/158 | (2006.01) |
| H02M 3/156 | (2006.01) |
| H02M 1/36 | (2007.01) |
| H02M 1/32 | (2007.01) |

(52) U.S. Cl.
CPC ........... *H02M 3/158* (2013.01); *H02M 3/156* (2013.01); *H02M 1/36* (2013.01); *H02M 2001/322* (2013.01)

(58) Field of Classification Search
CPC ..... H02M 2001/322; H02M 2001/002; H02M 2001/0096; H02M 3/156; H02M 3/158; H02M 1/36; H02M 3/1584
See application file for complete search history.

(56) References Cited

U.S. PATENT DOCUMENTS

| | | | |
|---|---|---|---|
| 8,643,351 B2 | 2/2014 | Lai et al. | |
| 8,693,276 B2 | 4/2014 | Lai et al. | |
| 2010/0194368 A1* | 8/2010 | Taylor | H05B 33/0815 323/284 |
| 2011/0025278 A1* | 2/2011 | Balakrishnan | H02M 1/32 320/166 |
| 2011/0133711 A1* | 6/2011 | Murakami | H03K 17/0822 323/282 |
| 2012/0033457 A1* | 2/2012 | Kim | H02M 3/33553 363/21.04 |
| 2013/0257409 A1* | 10/2013 | Komiya | H02M 3/156 323/311 |
| 2014/0210445 A1* | 7/2014 | Hasegawa | H04W 48/04 323/284 |
| 2015/0061611 A1* | 3/2015 | Li | H02M 3/1588 323/235 |
| 2015/0188425 A1* | 7/2015 | Chang | H02M 3/158 323/271 |

* cited by examiner

*Primary Examiner* — Gustavo Rosario Benitez (57) ABSTRACT

A switching converter has an input port for receiving an input voltage and an output port for providing an output voltage. The switching converter has a power stage, an energy stored circuit, a power conversion circuit and a control circuit. The power stage has an input terminal coupled to the input port and an output terminal coupled to the output port. The energy stored circuit is charged by the input voltage and provides a first bias voltage which maintains a predetermined time period after the input voltage is less than a predetermined voltage level. The power conversion circuit provides a second bias voltage. The control circuit provides a control signal to control the power stage and discharges the output voltage based on a discharge control signal, wherein the control circuit is powered by either the first bias voltage or the second bias voltage.

19 Claims, 6 Drawing Sheets

SWITCHING CONVERTER AND ASSOCIATED DISCHARGE METHOD

TECHNICAL FIELD

The present invention relates to electrical circuit, more particularly but not exclusively relates to switching converter.

BACKGROUND

For a Solid-State Drive (SSD) system or other compact power system, a switching converter is employed to provide a DC (Direct current) voltage, and complete output discharge for the switching converter is needed during power cycling in order to start up the SSD system at a certain state. If there is any residential voltage bias on an output port of the switching converter during power cycling, the SSD system is under a risk to start up at an uncertain state which may cause a system issue. Conventional output discharge circuit employs a transistor to discharge an output voltage of the switching converter. However, when an input voltage is lost, there is not enough power to drive the transistor. As a result, the transistor may not work normally to discharge the output voltage of the switching converter completely, and the SSD system suffers a risk of uncertain state during start up.

SUMMARY

It is one of the objects of the present invention to provide a switching converter and a method for discharging an output voltage of the switching converter to solve the above problems.

One embodiment of the present invention discloses a switching converter comprising: an input port, configured to receive an input voltage; an output port, configured to provide an output voltage; a power stage, having an input terminal, an output terminal and a control terminal, wherein the input terminal is coupled to the input port, and the output terminal is coupled to the output port; an energy stored circuit, having an input terminal coupled to the input port to receive the input voltage and an output terminal configured to provide a first bias voltage, wherein the first bias voltage maintains a predetermined time period after the input voltage becomes less than a predetermined voltage level; a power conversion circuit, having an input terminal and an output terminal, wherein the input terminal is coupled to the input port to receive the input voltage, and the output terminal is configured to provide a second bias voltage; and a control circuit, having a first input terminal, a second input terminal, a third input terminal, a fourth input terminal, and an output terminal, wherein the first input terminal is coupled to the output port, the second input terminal is configured to receive a discharge control signal, the third input terminal is coupled to the output terminal of the energy stored circuit to receive the first bias voltage, and the fourth input terminal is coupled to the output terminal of the power conversion circuit to receive the second bias voltage, and the output terminal is coupled to the control terminal of the power stage to provide a control signal based on the output voltage and a reference signal, wherein the control circuit is powered by either the first bias voltage or the second bias voltage; and wherein the control circuit is configured to discharge the output voltage based on the discharge control signal.

Another embodiment of the present invention discloses a switching converter, comprising: an input port, configured to receive an input voltage; an output port, configured to provide an output voltage; a comparison circuit, configured to provide a discharge control signal based on the input voltage and a threshold signal; a power stage, configured to provide the output voltage; an energy stored circuit, configured to provide a first bias voltage, wherein the first bias voltage maintains a predetermined time period after the input voltage is less than a predetermined voltage level; and a control circuit, configured to provide a control signal to control the power stage based on the output voltage and a reference signal, and wherein the control circuit is configured to discharge the output voltage based on the discharge control signal.

Yet another embodiment of the present invention discloses a method for discharging an output voltage of a switching converter, wherein the switching converter having an input port configured to receive an input voltage and an output port configured to provide the output voltage, wherein the method comprising: providing a discharge control signal based on the input voltage and a threshold signal; discharging the output voltage by a control circuit when the discharge control signal is effective; charging an energy stored device by the input voltage; and providing a first bias voltage by the energy stored device, wherein the first bias voltage maintains a predetermined time period after the input voltage is less than a predetermined voltage level; and wherein the control circuit is powered by the first bias voltage.

BRIEF DESCRIPTION OF THE DRAWINGS

Non-limiting and non-exhaustive embodiments are described with reference to the following drawings.

FIG. 2 schematically illustrates a switching converter 100*a* according to an embodiment of the present invention.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention, Some phrases are used in some exemplary embodiments. However, the usage of these phrases is not confined to these embodiments.

Several embodiments of the present invention are described below with reference to switching converter and associated discharging method. As used hereinafter, the term "couple" generally refers to multiple ways including a direct connection with an electrical conductor and an indirect connection through intermediate diodes, resistors, capacitors, and/or other intermediaries.

Figure 1:
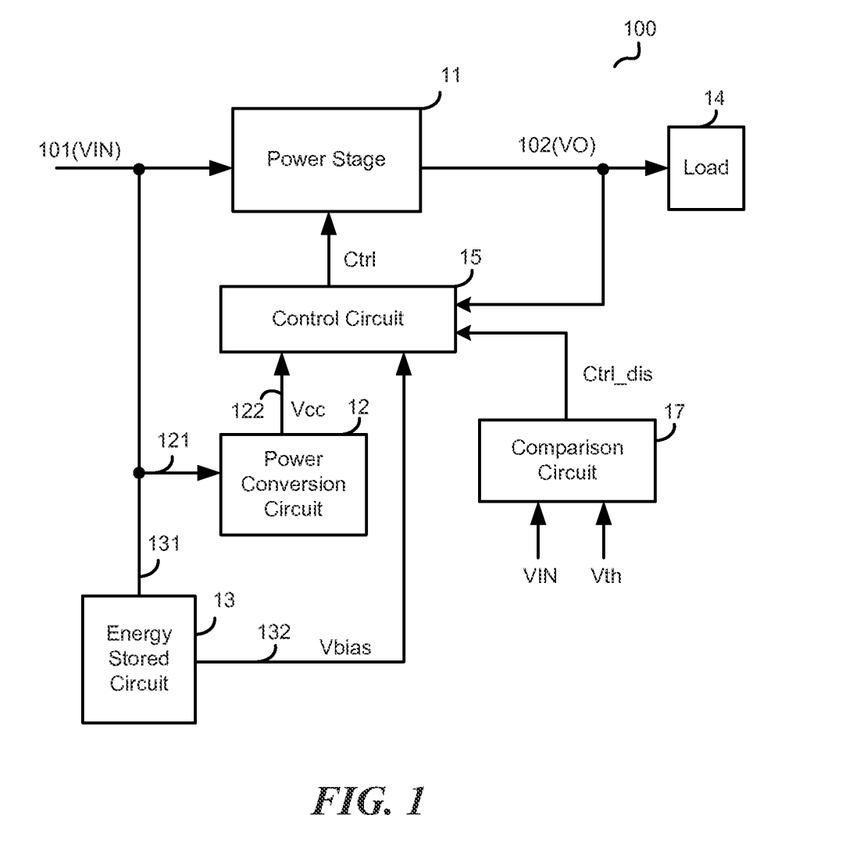
FIG. 1 illustrates a circuit block diagram of a switching converter 100 according to an embodiment of the present invention.

FIG. 1 illustrates a circuit block diagram of a switching converter 100 according to an embodiment of the present invention. Switching converter 100 comprises: an input port 101 configured to receive an input voltage VIN; an output port 102 configured to provide an output voltage VO to a load 14; a power stage 11 configured to convert input voltage VIN to output voltage VO; a power conversion circuit 12 configured to provide a voltage Vcc; an energy stored circuit 13 configured to provide a voltage Vbias even during a time period after input voltage VIN fails; a control circuit 15 configured to control power stage 11 to regulate output voltage VO; and a comparison circuit 17 configured to provide a discharge control signal Ctrl_dis. Where "when input voltage VIN fails" refers to a situation that input voltage VIN is less than a predetermined voltage level and switching converter 100 is shut down when input voltage VIN fails.

Power stage 11 comprises at least one switch, and the at least one switch is configured to be turned ON and/or turned OFF to convert input voltage VIN to output voltage VO. Power stage 11 may be configured in any suitable topology, such as step-down converter, step-up converter, Flyback converter, load switch and so on. The at least one switch in power stage 11 may be any controllable semiconductor device, such as MOSFET (metal oxide semiconductor field effect transistor), IGBT (isolated gate bipolar transistor) and so on.

Power conversion circuit 12 may be employed to supply voltage Vcc to control circuit 15 for powering any possible device or circuit, e.g., logic circuit, amplifier, comparator and so on. Power conversion circuit 12 comprises an input terminal 121 coupled to input port 101 and an output terminal 122 coupled to control circuit 15 to provide voltage Vcc. One of ordinary skill in the art should appreciate that power conversion circuit 12 may comprise any suitable topology configured to provide a DC voltage, such as LDO (Low Dropout Regulator), DC-DC converter, charge pump circuit and so on without detracting from merits of the present invention.

Energy stored circuit 13 may be employed to supply voltage Vbias to control circuit 15 for powering any possible device or circuit. In one embodiment, voltage Vbias maintains a time period after input voltage VIN fads to make sure normal operation of control circuit 15. Energy stored circuit 13 comprises an input terminal 131 coupled to input port 101 to receive input voltage VIN, and an output terminal 132 coupled to control circuit 15 to provide voltage Vbias. In one embodiment, energy stored circuit 13 is configured to store energy when input voltage VIN is valid, for example, VIN>0.3V, and is configured to provide voltage Vbias to control circuit 15 even during a time period after input voltage VIN fails, for example, VIN<0.3V. In one embodiment, energy stored circuit 13 comprises an energy stored device for storing energy when input voltage VIN is valid, and the energy stored device at least supplies voltage Vbias to power control circuit 15 during a time period after input voltage VIN fails. Energy stored circuit 13 may further comprise a block device for blocking a current path from the energy stored device to input port 101.

Control circuit 15 is configured to control power stage 11 based on output voltage VO and a reference signal Vref. In one embodiment, control circuit 15 is configured to provide a control signal Ctrl to control power stage 11, wherein control signal Ctrl is provided by a close loop control circuit based on a difference between reference signal Vref and a feedback signal representing output voltage VO. Control circuit 15 is configured to discharge output voltage VO when discharge control signal Ctrl_dis is effective. In one embodiment, control circuit comprises at least one active device to discharge output voltage VO. The active device refers to any type of circuit component with the ability to electrically control electron flow, for example, vacuum tube, transistor, current source, voltage source and so on. The active device needs external voltage supply for normal working. In one embodiment, voltage Vbias is supplied to the active device to discharge output voltage VO. In one embodiment, control circuit 15 is configured to discharge output voltage VO directly through a discharging circuit In another embodiment, control circuit 15 is configured to damp down reference signal Vref, and accordingly output voltage VO decreases with reference signal Vref per the close loop control circuit employed by control circuit 15.

In one embodiment, comparison circuit 17 is employed to provide discharging control signal Ctrl_dis based on input voltage VIN and a threshold signal Vth. In one embodiment, when input voltage VIN is less than threshold signal Vth, discharge control signal Ctrl_dis becomes effective to discharge output voltage VO.

In one embodiment, load 14 comprises a device that needs to start up without any residential voltage bias, such as SSD (Solid State Driver), portable instrument, battery-powered device and so on. When input voltage VIN is less than threshold signal Vth, discharge control signal Ctrl_dis becomes effective, control circuit 15 is powered at least by voltage Vbias to discharge output voltage VO, e.g., to about 0V. As a result, output voltage VO of switching converter 100 could be discharged completely even when input voltage VIN fails, and load 14 could start up without any unknown state during power cycling.

Figure 2:
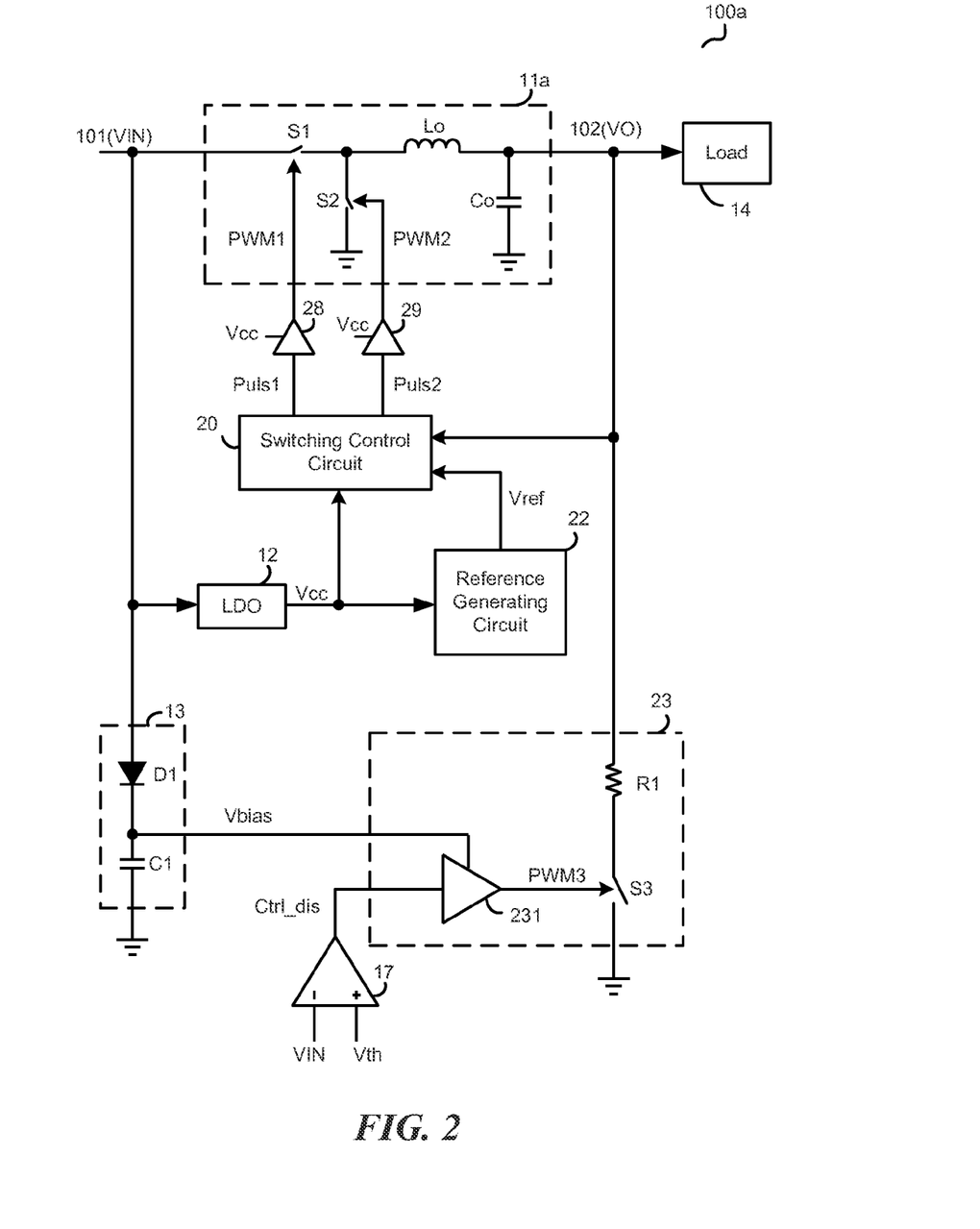

FIG. 2 schematically illustrates a switching converter 100a according to an embodiment of the present invention. Switching converter 100a comprises: input port 101 configured to receive input voltage VIN, output port 102 configured to provide output voltage VO to load 14, a power stage 11a, a LDO as power conversion circuit 12, energy stored circuit 13, comparison circuit 17 and a control circuit, wherein the control circuit comprises a switching control circuit 20, a reference generating circuit 22, and a discharge circuit 23.

Power stage 11a comprises a switch S1, a switch S2, an inductor Lo and an output capacitor Co. Power stage 11a is configured to regulate output voltage VO through turning ON and/or turning OFF switch S1 and switch S2. One terminal of switch S1 is coupled to input port 101, the other terminal of switch S1 is coupled to one terminal of switch S2, and the other terminal of switch S2 is coupled to a system ground. One terminal of inductor Lo is coupled to a common terminal of switch S1 and switch S2, the other terminal of inductor Lo is coupled to one terminal of output capacitor Co and output port 102, and the other terminal of output capacitor Co is coupled to the system ground. A voltage across output capacitor Co is output voltage VO. In one embodiment, switch S2 may be substituted by a diode.

One of ordinary skill in the art should also understand that any other suitable topology may be employed by power stage 11a without detracting from merits of the present invention. Based on output voltage VO and reference signal Vref, switching control circuit 20 is configured to provide a pulse signal Puls1 to control switch S1 and provide a pulse signal Puls2 to control switch S2. One of ordinary skill in the art should also appreciate that any suitable control circuit and/or control method could be used by switching control circuit 20 to control switch S1 and switch S2 without detracting from merits of the present invention. For example, switching control circuit 20 may adopt constant-ON time control, peak current mode control, voltage mode control and so on. A driving circuit 28 is employed to provide a driving signal PWM1 to a control terminal of switch S1 based on pulse signal Puls1. A driving circuit 29 is employed to provide a driving signal PWM2 to a control terminal of switch S2. In one embodiment, driving circuit 28 and driving circuit 29 are powered by voltage Vcc. Term "driving circuit" here refers to a circuit used to amplify a control signal (e.g., pulse signal) from switching control circuit in order to control a semiconductor device. In one embodiment shown in FIG. 2, reference generating circuit 22 is configured to provide reference signal Vref, and a feedback signal representing output voltage VO is regulated by switching control circuit 20 to follow reference signal Vref. In one embodiment, voltage Vcc is provided to switching control circuit 20 and reference generating circuit 22 as a bias voltage, i.e., switching control circuit 20 and reference generating circuit 22 are powered by voltage Vcc. Term "bias voltage" refers to a voltage supply that a device/circuit needs for normal operation.

Discharge circuit 23 comprises a switch S3 and a resistor R1 coupled in series. In the embodiment shown in FIG. 2, one terminal of resistor R1 is coupled to output port 102, the other terminal of resistor R1 is coupled to one terminal of switch S3, and the other terminal of switch S3 is coupled to the system ground. A control terminal of switch S3 is configured to receive a driving signal PWM3. In one embodiment, switch S3 is turned ON to discharge output capacitor Co through resistor R1 when driving signal PWM3 is effective, e.g., PWM3="1". Switch 53 may be any suitable controllable semiconductor device, such as MOSFET, IGBT and so on. Resistor R1 may be substituted by an ON-resistance of switch S3. Discharge circuit 23 further comprises a driving circuit 231 for driving switch S3. Driving circuit 231 is configured to receive discharge control signal Ctrl_dis and provide driving signal PWM3 to the control terminal of switch S3 accordingly. In one embodiment, driving circuit 231 is powered by voltage Vbias. Energy stored circuit 13 comprises a diode D1 as a block device and a capacitor C1 as an energy stored device. One of ordinary skill in the art should appreciate that any suitable device/circuit used to block a current path from the energy stored device to input port 101 may be employed as the block device. In one embodiment, diode D1 comprises a cathode and an anode, wherein the anode of diode D1 is coupled to input port 101 to receive input voltage VIN, and the cathode of diode D1 is coupled to one terminal of capacitor C1, the other terminal of capacitor C1 is coupled to the system ground, and a voltage across capacitor C1 is bias voltage Vbias. Capacitor C1 is charged by input voltage VIN. Diode D1 blocks a current path from capacitor C1 to input port 101, In one embodiment, voltage Vbias maintains a predetermined time period after input voltage VIN fails, wherein the predetermined time period is adjusted by a capacitance of capacitor C1, e.g., the predetermined time period is shorten when the capacitance of capacitor C1 decreases. As a result, when input voltage VIN fails, discharge circuit 23 is powered by voltage Vbias and is able to discharge output voltage VO completely.

Switching converter 100a further comprises a comparison circuit 17 configured to provide discharge control signal Ctrl_dis. In one embodiment, comparison circuit 17 comprises a comparator having an inverting terminal configured to receive input voltage VIN, a non-inverting terminal configured to receive threshold signal Vth, and an output terminal configured to provide discharge control signal Ctrl_dis via comparing input voltage VIN with threshold signal Vth. In one embodiment, when input voltage VIN is less than threshold signal Vth, discharge control signal Ctrl_dis becomes effective to discharge output voltage VO.

Figure 3:
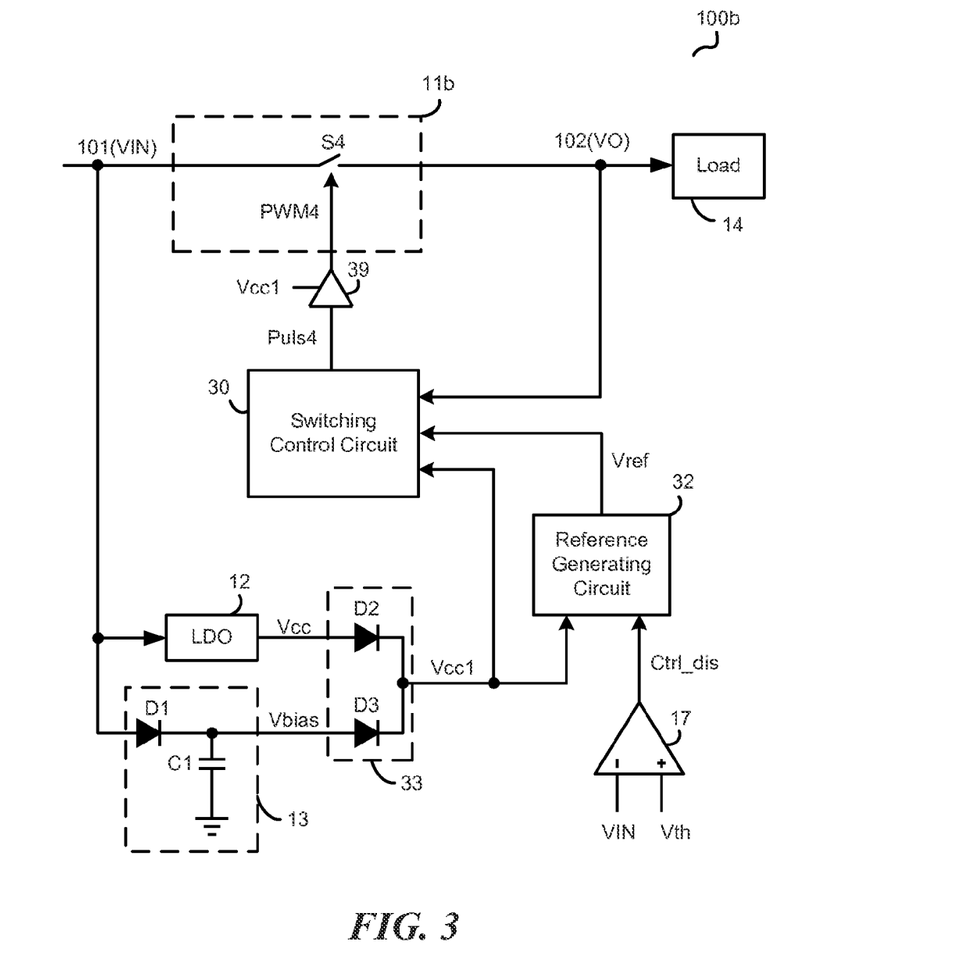
FIG. 3 schematically illustrates a switching converter 100*b* according to another embodiment of the present invention.

FIG. 3 schematically illustrates a switching converter 100b according to another embodiment of the present invention. Switching converter 100b comprises: input port 101 configured to receive input voltage VIN, output port 102 configured to provide output voltage VO to bad 14, a power stage 11b, power conversion circuit 12, energy stored circuit 13, comparison circuit 17 and a control circuit, wherein the control circuit comprises a switching control circuit 30, and a reference generating circuit 32.

Power stage 11b employs a switch 54 as a bad switch, and power stage 11b is configured to adjust output voltage VO through turning ON and turning OFF switch 34. One terminal of switch S4 is coupled to input port 101, the other terminal of switch S4 is coupled to output port 102, and a control terminal of switch S4 is configured to receive a driving signal PWIM4. One of ordinary skill in the art should also understand that any other suitable topology may be employed by power stage 11b without detracting from merits of the present invention.

Switching control circuit 30 is configured to provide a pulse signal Puls4 to control switch S4 based on output voltage VO and reference signal Vref. In one embodiment, a close loop control circuit is employed to generate pulse signal Puls4 based on a difference between reference signal Vref and output Voltage VO or a feedback signal representing output voltage VO. One of ordinary skill in the art should understand that the close loop control circuit may comprise any suitable control mode without detracting from merits of the present invention, such as constant ON-time control, constant OFF-time control, voltage mode control, peak current mode control, and average current mode control and so on. In one embodiment, switching control circuit 30 may be powered by voltage Vcc or voltage Vbias. A driving circuit 39 is configured to receive pulse signal Puls4 and provide driving signal PWM4 to control terminal of switch S4. In one embodiment, driving circuit 39 may be powered by either voltage Vcc or voltage Vbias.

Reference generating circuit 32 is configured to provide reference signal Vref. In one embodiment, when discharge control signal Ctrl_dis is effective, reference generating circuit 32 is configured to ramp down reference signal Vref, as a result, output voltage VO decreases with reference signal Vref under control of switching control circuit 30, i.e., output voltage VO is discharged by switching control circuit 30 in accordance with reference signal Vref.

In one embodiment, switching converter 100b further comprises a voltage selection circuit 33. Voltage selection circuit 33 is configured to select one of voltage Vcc and voltage Vbias as a bias voltage Vcc1 provided to power switching control circuit 30 and reference generating circuit 32. One of ordinary skill in the art should also understand that voltage selection circuit 33 may also be part of switching control circuit 30 and/or be part of reference generating circuit 32. In one embodiment, voltage selection circuit 33 is configured to select a maximum value of voltage Vcc and voltage Vbias as voltage Vcc1. As shown in FIG. 3, voltage selection circuit 33 comprises a diode D2 and a diode D3. An anode of diode D2 is coupled to power conversion circuit 12 to receive voltage Vcc, an anode of diode D3 is coupled to energy stored circuit 13 to receive voltage Vbias, a cathode of diode D2 and a cathode of diode D3 are coupled together to provide bias voltage Vcc1.

Figure 4:
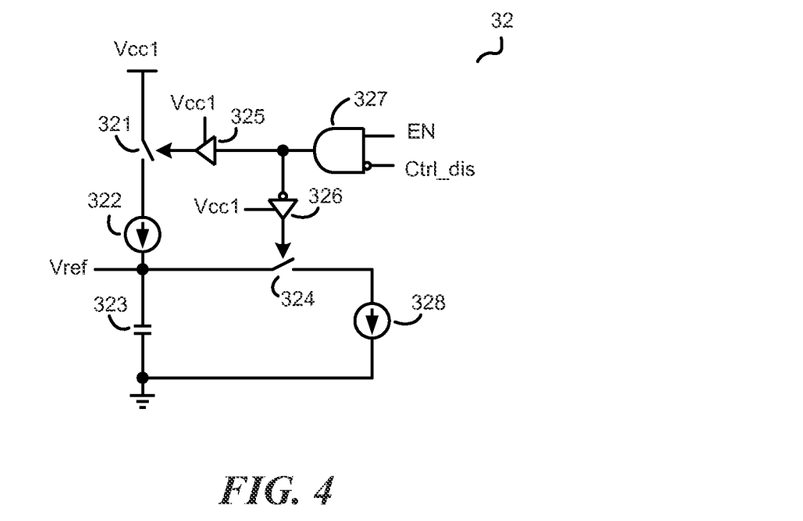
FIG. 4 schematically illustrates reference generating circuit 32 of switching converter 100*b* as shown in FIG. 3 according to one embodiment of the present invention.

FIG. 4 schematically illustrates reference generating circuit 32 of switching converter 100b as shown in FIG. 3 according to one embodiment of the present invention. Reference generating circuit 32 comprises a switch 321, a current source 322, a capacitor 323, a switch 324, a driving circuit 325, a driving circuit 326, a logic circuit 327 and a current source 328.

Reference generating circuit 32 is configured to provide reference signal Vref across capacitor 323. As shown in FIG. 4, one terminal of switch 321 is coupled to voltage Vcc1, the other terminal of switch 321 is coupled to one terminal of current source 322, and the other terminal of current source 322 is coupled to one terminal of capacitor 323. One terminal of switch 324 is coupled to one terminal of capacitor 323, the other terminal of switch 324 is coupled to one terminal of current source 328, and the other terminal of current source 328 is coupled to the other terminal of capacitor 323. Logic circuit 327 comprises a first input terminal configured to receive an enable signal EN, a second input terminal configured to receive discharge control signal Ctrl_dis, and an output terminal. Driving circuit 325 comprises an input terminal coupled to the output terminal of logic circuit 327, and an output terminal coupled to a control terminal of switch 321. Driving circuit 326 comprises an input terminal coupled to the output terminal of logic circuit 327, and an output terminal coupled to a control terminal of switch 324. Logic circuit 327 is configured to control switch 321 and switch 324 based on enable signal EN and discharge control signal Ctrl_dis. In one embodiment, when enable signal EN is effective and discharge control signal Ctrl_dis is ineffective, switching converter 100b starts up, switch 321 is turned ON and switch 324 is turned OFF, capacitor 323 is charged by current source 322, and voltage across capacitor 323 increases, i.e., reference signal Vref increases. When enable signal EN is ineffective or discharge control signal Ctrl_dis is effective, switch 321 is turned OFF and switch 324 is turned ON, capacitor 323 is discharged through current source 328, and reference signal Vref decreases, as a result, output voltage VO is discharged by switching control circuit 30. In one embodiment, driving circuit 325 and driving circuit 326 is powered by voltage Vcc1.

Figure 5:
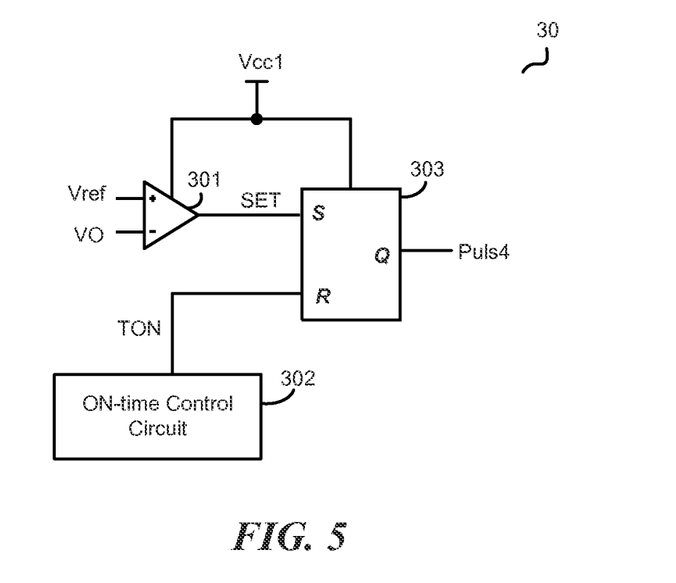
FIG. 5 schematically illustrates switching control circuit 30 of switching converter 100*b* as shown in FIG. 3 according to one embodiment of the present invention.

FIG. 5 schematically illustrates switching control circuit 30 of switching converter 100b as shown in FIG. 3 according to one embodiment of the present invention. In the embodiment shown in FIG. 5, switching control circuit 30 employs ON-time control mode. But one with ordinary skill in the art should also appreciate that any other control mode may be employed by switching control circuit 30. As shown in FIG. 5, switching control circuit 30 comprises a comparator 301, an ON-time control circuit 302 and a flip-flop 303. A non-inverting terminal of comparator 301 is configured to receive reference signal Vref, an inverting terminal of comparator 301 is configured to receive output voltage VO, and an output terminal of comparator 301 is configured to provide a set signal SET based on comparing output voltage VO with reference signal Vref. ON-time control circuit 302 is configured to provide an ON-time control signal TON to control an ON-time period of switch S4. Flip-flop 303 is configured to provide pulse signal Puls4 based on set signal SET and ON-time control signal TON. A set terminal S of flip-flop 303 is coupled to the output terminal of comparator 301 to receive set signal SET, a reset terminal R of flip-flop 303 is coupled to ON-time control circuit 302 to receive ON-time control signal TON, and an output terminal Q of flip-flop 303 is configured to provide pulse signal Puls4. Comparator 301 and flip-flop 303 are powered by voltage Vcc1.

Figure 6:
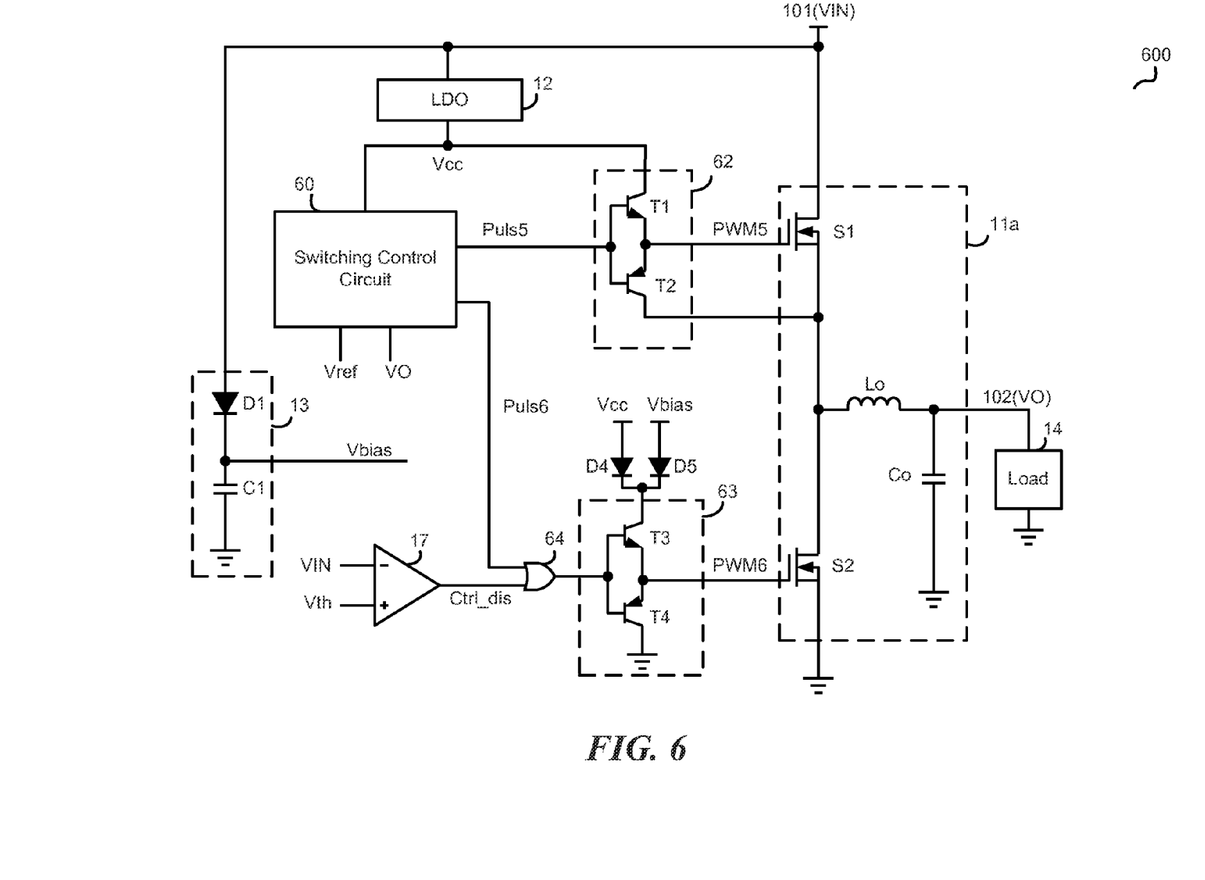
FIG. 6 schematically illustrates a switching converter 600 according to another embodiment of the present invention.

FIG. 6 schematically illustrates a switching converter 600 according to another embodiment of the present invention. Switching converter 600 differs from switching converter 100a in that low side switch S2 in power stage 11a is multi-used to discharge output voltage VO when discharge control signal Ctrl_dis is effective. As shown in FIG. 6, switch S1 and switch S2 are MOSFET. However, ordinary skill in the art should also appreciate that any other types of switch could be used without detracting from merits of the present invention.

A switching control circuit 60 is configured to provide a pulse signal Puls5 to control switch S1 and provide a pulse signal Puls6 to control switch S2 based on output voltage VO and reference signal Vref. A driving circuit 62 is employed to provide a driving signal PWM5 to the control terminal of switch S1 in accordance with pulse signal Puls5. In one embodiment, driving circuit 62 comprises a transistor T1 and a transistor T2, wherein a Collector of transistor T1 is coupled to voltage Vcc, an Emitter of transistor T1 is coupled to a Collector of transistor T2, and a Base of transistor T1 and a Base of transistor T2 are coupled together to receive pulse signal Puls5. A driving circuit 63 is employed to provide a driving signal PWM6 to the control terminal of switch 52 in accordance with pulse signal Puls6. Driving circuit 63 comprises a transistor T3 and a transistor 14, wherein a Collector of transistor T3 is coupled to voltage Vcc through a diode D4 and coupled to voltage Vbias through a diode D5, an Emitter of transistor T3 is coupled to a Collector of transistor T4, and an Emitter of transistor 14 is coupled to the system ground. In one embodiment, switch S2 is controlled based on pulse signal Puls6 and discharge control signal Ctrl_dis through a logic circuit 64. Logic circuit 64 comprises a first input terminal coupled to switching control circuit 60 to receive pulse signal Puls6, a second input terminal coupled comparison circuit 17 to receive discharge control signal Ctrl_dis, and an output terminal coupled to a Base of transistor T3 and a Base of transistor T4. One with ordinary skill in the art should also appreciate that any other suitable circuit may be employed as driving circuit 62 and/or driving circuit 63 without detracting from merits of the present invention. In one embodiment, logic circuit 64 comprises an OR gate, and switch S2 is configured to be turned ON when pulse signal PulsS or discharge control signal Ctrl_dis becomes effective. As shown in FIG. 6, when input voltage VIN is less than threshold signal Vth, discharge control signal Ctrl_dis becomes effective, switch S2 is turned ON to discharge output voltage VO.

Figure 7:
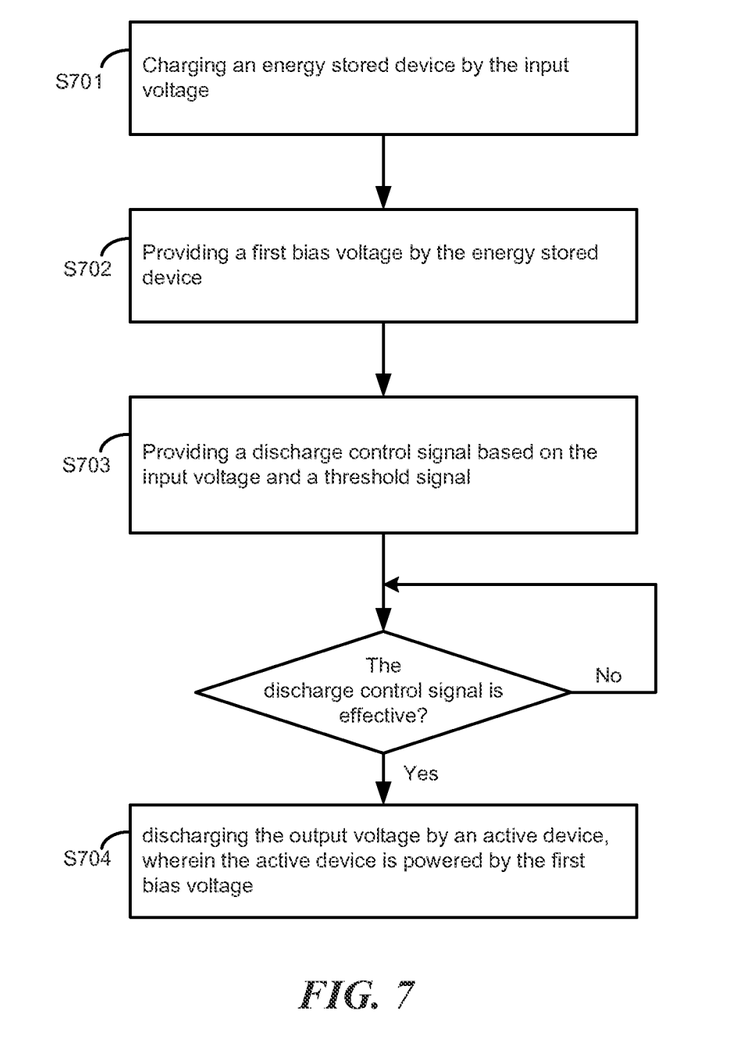
FIG. 7 shows a flow chart illustrating a discharge method for a switching converter according to an embodiment of the present invention.

FIG. 7 shows a flow chart illustrating a method for discharging an output voltage of a switching converter. The switching converter comprises an input port configured to receive an input voltage, and an output port configured to provide an output voltage. The method comprises steps S701-S704.

At step S701, charging an energy stored device by the input voltage.

At step S702, providing a first bias voltage by the energy stored device, wherein the first bias voltage maintains a predetermined time period after the input voltage is less than a predetermined voltage level.

At step S703, providing a discharge control signal based on the input voltage and a threshold signal.

When the input voltage is less than the threshold signal, the discharge control signal becomes effective, and then transits to step S704, discharging the output voltage by an active device. In one embodiment, the active device is powered by the first bias voltage.

Note that in the flow chart described above, the box functions may also be implemented with different order as shown in FIG. 7. For example, two successive box functions may be executed meanwhile, or sometimes the box functions may be executed in reverse order.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A switching converter, comprising: an input port, configured to receive an input voltage; an output port, configured to provide an output voltage; a power stage, having an input terminal, an output terminal and a control terminal, wherein the input terminal is coupled to the input port, and the output terminal is coupled to the output port; an energy stored circuit, having an input terminal coupled to the input port to receive the input voltage and an output terminal configured to provide a first bias voltage, wherein the first bias voltage maintains a predetermined time period after the input voltage becomes less than a threshold signal; a power conversion circuit, having an input terminal and an output terminal, wherein the input terminal is coupled to the input port to receive the input voltage, and the output terminal is configured to provide a second bias voltage; and a control circuit, having a first input terminal, a second input terminal, a third input terminal, a fourth input terminal and an output terminal, wherein the first input terminal is coupled to the output port, the second input terminal is configured to receive a discharge control signal, the third input terminal is coupled to the output terminal of the energy stored circuit to receive the first bias voltage, and the fourth input terminal is coupled to the output terminal of the power conversion circuit to receive the second bias voltage, and the output terminal is coupled to the control terminal of the power stage to provide a control signal based on the output voltage and a reference signal, wherein the control circuit is powered by either the first bias voltage or the second bias voltage; and wherein the control circuit is configured to discharge the output voltage based on the discharge control signal, when the input voltage is less than the threshold signal, the output voltage is fully discharged to ground by the control circuit, wherein the control circuit further comprising: a discharge switch, having a control terminal, wherein the discharge switch is configured to discharge the output voltage based on the discharge control signal.

2. The switching converter of claim 1, wherein the energy stored circuit further comprising:
a block device, having a first terminal coupled to the input port and a second terminal; and
an energy stored device, coupled to the second terminal of the block device and is configured to provide the first bias voltage, and wherein the energy device is charged by the input voltage; and wherein the block device is configured to block a current path from the energy stored device to the input port.

3. The switching converter of claim 1, wherein the energy stored circuit further comprising:
a diode, having an anode coupled to the input port and a cathode; and
a first capacitor, having a first terminal coupled to the cathode of the diode, and a voltage across the first capacitor is provided as the first bias voltage.

4. The switching converter of claim 1, wherein the discharge control signal is provided based on comparing the input voltage with the threshold signal.

5. The switching converter of claim 1, wherein the control circuit further comprising: a driving circuit, having an input terminal, a bias terminal and an output terminal, wherein the input terminal is configured to receive the discharge control signal, the bias terminal is coupled to the output terminal of the energy stored circuit to receive the first bias voltage, and the output terminal is configured to provide a drive signal to the control terminal of the discharge switch, and wherein the driving circuit is powered by the first bias voltage.

6. The switching converter of claim 1, wherein the control circuit further comprising a reference generating circuit, configured to provide the reference signal based on the discharge control signal, wherein the reference signal ramps down when the discharge signal becomes effective, and wherein the reference generating circuit is powered by either the first bias voltage or the second bias voltage.

7. A switching converter, comprising: an input port, configured to receive an input voltage; an output port, configured to provide an output voltage; a comparison circuit, configured to provide a discharge control signal based on the input voltage and a threshold signal; a power stage, configured to provide the output voltage; an energy stored circuit, configured to provide a first bias voltage, wherein the first bias voltage maintains a predetermined time period after the input voltage is less than the threshold signal; and a control circuit, configured to provide a control signal to control the power stage based on the output voltage and a reference signal, and wherein the control circuit is configured to discharge the output voltage based on the discharge control signal; and wherein when the input voltage is less than the threshold signal, the output voltage is completely discharged by the control circuit; wherein the control circuit further comprising a reference generating circuit, the reference generating circuit comprises: a second capacitor, having a first terminal and a second terminal; a first current source, having a first terminal and a second terminal, wherein the first terminal is coupled to the first bias voltage or the second bias voltage, and wherein the second terminal is coupled to the first terminal of the second capacitor; and a second current source, having a first terminal and a second terminal, wherein the first terminal is coupled to the first terminal of the second capacitor, and wherein the second terminal is coupled to the second terminal of the second capacitor; and wherein the second capacitor is discharged by the second current source when the discharge control signal is effective.

8. The switching converter of claim 7, wherein the energy stored circuit further comprising:
an energy stored device, wherein the energy stored device is charged by the input voltage, and the energy stored device is configured to supply the first bias voltage; and
a block device, coupled to the energy stored device in series for blocking a current path from the energy stored device to the input port.

9. The switching converter of claim 7, wherein the control circuit further comprising:
a discharge switch, having a first terminal, a second terminal and a control terminal, wherein the first terminal is coupled to the output port, the second terminal is coupled to a system ground; and
a driving circuit, having an input terminal, a bias terminal and an output terminal, wherein the input terminal is configured to receive the discharge control signal, the bias terminal is configured to receive the first bias voltage, and the output terminal is coupled to the control terminal of the discharge switch to provide a driving signal, and wherein the driving circuit is powered by the first bias voltage.

10. The switching converter of claim 9, wherein the energy stored circuit further comprising:
a diode, having an anode coupled to the input port and a cathode; and
a first capacitor, having a first terminal and a second terminal, wherein the first terminal is coupled to the cathode of the diode, and the second terminal is coupled to the system ground; and wherein
the first terminal of the first capacitor is coupled to the bias terminal of the driving circuit to provide the first bias voltage.

11. The switching converter of claim 7, further comprising a power conversion circuit, having an input terminal and an output terminal, wherein the input terminal is coupled to the input port to receive the input voltage, and the output terminal is configured to provide a second bias voltage.

12. The switching converter of claim 11, wherein the control circuit is powered by either the first bias voltage or the second bias voltage.

13. The switching converter of claim 11, wherein the reference generating circuit, configured to provide the reference signal, wherein the reference signal ramps down when the discharge control signal becomes effective, and wherein the reference generating circuit is powered by either the first bias voltage or the second bias voltage.

14. The switching converter of claim 7, wherein the power stage further comprising:
a first switch, having a first terminal, a second terminal and a control terminal, wherein the first terminal is coupled to the input port;
a second switch, having a first terminal, a second terminal and a control terminal, wherein the first terminal is coupled to the second terminal of the first switch, the second terminal is coupled to a system ground;
an inductor, having a first terminal and a second terminal, wherein the first terminal is coupled to the second terminal of the first switch and the first terminal of the second switch; and
a third capacitor, having a first terminal and a second terminal, wherein the first terminal is coupled to the second terminal of the inductor, and the second terminal is coupled to the system ground; and wherein the control circuit is coupled to the control terminal of the first switch and the control terminal of the second switch to control the first switch and the second switch based on the output voltage and the reference signal.

15. The switching converter of claim 14, wherein the second switch is configured to discharge the output voltage when the discharge control signal is effective.

16. A method for discharging an output voltage of a switching converter, wherein the switching converter having an input port configured to receive an input voltage and an output port configured to provide the output voltage, an energy stored circuit, having an input terminal coupled to the input port to receive the input voltage and an output terminal configured to provide a first bias voltage, wherein the first bias voltage maintains a predetermined time period after the input voltage becomes less than a threshold signal;
a power conversion circuit, having an input terminal and an output terminal, wherein the input terminal is coupled to the input port to receive the input voltage, and the output terminal is configured to provide a second bias voltage; and
a control circuit, having a first input terminal, a second input terminal, a third input terminal, a fourth input terminal and an output terminal, wherein the first input terminal is coupled to the output port, the second input terminal is configured to receive a discharge control signal, the third input terminal is coupled to the output terminal of the energy stored circuit to receive the first bias voltage, and the fourth input terminal is coupled to the output terminal of the power conversion circuit to receive the second bias voltage, wherein the control circuit is powered by either the first bias voltage or the second bias voltage;
wherein the method comprising: providing the discharge control signal based on the input voltage and the threshold signal; discharging the output voltage by an active device when the discharge control signal is effective; charging the energy stored device by the input voltage; and providing the first bias voltage by the energy stored device, wherein the first bias voltage maintains a predetermined time period after the input voltage is less than the threshold signal; wherein the active device is powered by the first bias voltage; and wherein when the input voltage is less than the threshold signal, the output voltage is fully discharged to ground by the active device.

17. The method of claim 16, further comprising blocking a current path from the energy stored device to the input port.

18. The method of claim 16, wherein the energy stored device comprising a capacitor, wherein the capacitor is charged by the input voltage and the capacitor is configured to provide the first bias voltage.

19. The method of claim 18, wherein the predetermined time period is adjusted in accordance with a capacitance of the capacitor.

* * * * *